United States Patent [19]
Tanuma

[11] Patent Number: 5,901,282
[45] Date of Patent: May 4, 1999

[54] BACK-UP METHOD FOR FIRMWARE INFORMATION

[75] Inventor: Hiroyuki Tanuma, Tokyo, Japan

[73] Assignee: NEC Corporation, Tokyo, Japan

[21] Appl. No.: 08/868,581

[22] Filed: Jun. 4, 1997

[30] Foreign Application Priority Data

Jun. 4, 1996 [JP] Japan .................................. 8-141657

[51] Int. Cl.⁶ .............................. G06F 11/00; G06F 17/30
[52] U.S. Cl. ...................................... 395/182.13; 711/162
[58] Field of Search ......................... 395/182.11, 182.1, 395/182.04, 182.13, 651; 711/162, 161; 707/204, 201

[56] References Cited

U.S. PATENT DOCUMENTS

| | | | |
|---|---|---|---|
| 5,375,240 | 12/1994 | Grundy | 395/700 |
| 5,642,505 | 6/1997 | Fushimi | 395/620 |
| 5,805,719 | 9/1998 | Pare, Jr. et al. | 382/115 |
| 5,812,398 | 9/1998 | Nielson | 364/285.1 |

FOREIGN PATENT DOCUMENTS

| | | | |
|---|---|---|---|
| 4-133134 | 5/1992 | Japan | G06F 11/22 |
| 5-344565 | 12/1993 | Japan | H04Q 9/00 |
| 7-56959 | 3/1995 | Japan | G06F 15/74 |

*Primary Examiner*—Joseph E. Palys
*Attorney, Agent, or Firm*—Sughrue, Mion, Zinn, Macpeak & Seas, PLLC

[57] ABSTRACT

The object of the invention is to provide a back-up method for information for setting a system control apparatus by which externally back up data can be used even if version up of or addition of a function to firmware is effected and the back up data can be edited manually. An encoder unit 14 for converting a form of firmware information for internal setting 12 into an apparatus definition file 17 of the text form and a decoder unit 13 for converting the apparatus definition file 17 of the text form into the form of the firmware information for internal setting 12 are provided in a system control apparatus 11, and the form of the firmware information for internal setting 12 is converted into the apparatus definition file 17 of the text form by the encoder unit 12 and the apparatus definition file 17 of the text form is up-loaded into and backed up by a back-up apparatus 16, whereafter, when necessary, the apparatus definition file 17 of the text form of the back-up apparatus 16 is converted into the form of the firmware for internal setting information 12 by the decoder unit 13 and down-loaded into the system control apparatus 11.

6 Claims, 2 Drawing Sheets

BACK-UP METHOD FOR FIRMWARE INFORMATION

BACKGROUND OF THE INVENTION

1. Field of the Invention

This invention relates to a back-up method for externally backing up firmware information for internal setting of a system control apparatus of the embedded type.

2. Description of the Related Art

In a system control apparatus of the embedded type, in externally backing up the information of the firmware for internal setting of the apparatus, conventionally the information for setting the apparatus is backed up by an external back up apparatus in the same binary data form as the form of the internal information of the apparatus.

FIG. 1 is a block diagram of a setting information back-up system for a system control apparatus of a conventional example. Referring to FIG. 1, reference numeral 41 denotes a system control apparatus, 42 information for internal setting of the apparatus, 45 a communication unit, 46 an apparatus information back-up apparatus, and 47 a back-up file.

The information for internal setting 42 of the system control apparatus 41 is up-loaded into the back-up file 47 of the apparatus information back-up apparatus 46 via the communication unit 45, and when necessary, the back up data are down-loaded into the internal information for internal setting 42 of the system control apparatus 41 by the reverse route.

With the prior art, it is a first problem that it sometimes becomes impossible to use the back up data by version up of the firmware. The reason is that, by the version up of the firmware, the form of the information for internal setting of the apparatus is changed or the memory allocation is changed.

It is a second problem that the back up data cannot be edited manually. The reason is that the back up data have the same form as the information for internal setting of the apparatus and cannot be recognized visually by a human being.

Further, it is a third problem that, when a function is added to the apparatus, it sometimes becomes impossible to use the back up data. The reason is that the information for setting the apparatus is backed up in the same binary data form as that of the internal information of the apparatus.

SUMMARY OF THE INVENTION

It is an object of the present invention to provide a back-up method for information for setting a system control apparatus in which externally backed up data can be used even if version up of or addition of a function to firmware of the apparatus is effected, and in which the back up data can be edited manually.

A back-up method for firmware information of the present invention is a back-up method for backing up firmware information for internal setting of a system control apparatus using an external back-up apparatus, wherein an encoder unit for converting the form of the firmware information for internal setting into an apparatus definition file of the text format and a decoder unit for converting the apparatus definition file of the text form into the form of the firmware information for internal setting are provided in said system control apparatus. Backing up of the firmware information is effected by the encoder unit converting the form of the firmware information for internal setting into the apparatus definition file of the text form and up-loading to and backing up the apparatus definition file of the text form into by the back-up apparatus and converting by the decoder unit, when necessary, the apparatus definition file of the text form of the back-up apparatus into the form of the firmware information for internal setting and down-loading the firmware information for internal into the system control apparatus.

When a function is added to the firmware of the system control apparatus, the same function may be added to the apparatus definition file of the external back-up apparatus. Or, setting of the firmware internal information of the system control apparatus may be effected by down-loading of the apparatus definition file of the text form of the back-up apparatus edited using a text processing tool. Or else, setting of the firmware internal information of the system control apparatus may be effected by down-loading of an apparatus definition file of the text form up-loaded in the text form from any other system control apparatus into the back-up apparatus and edited using a text processing tool.

The back-up method for firmware information may be a system wherein an internal apparatus default value of the firmware of the system control apparatus is not encoded into the apparatus definition file.

Further, the system control apparatus may be a system control apparatus for transfer control.

The above and other object, features, and advantages of the present invention will become apparent from the following description based on the accompanying drawings which illustrate an example of a preferred embodiment of the present invention.

DETAILED DESCRIPTION OF THE PREFERRED EMBODIMENT

Figure 1:
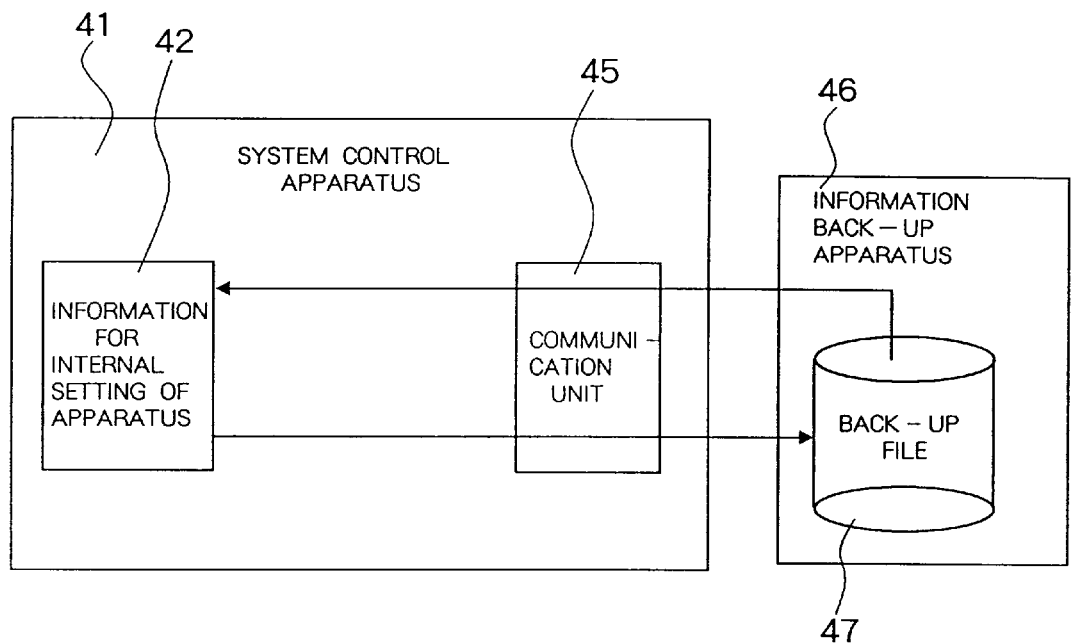
FIG. 1 is a block diagram of a back-up system for information for setting a system control apparatus of a conventional type.
Figure 2:
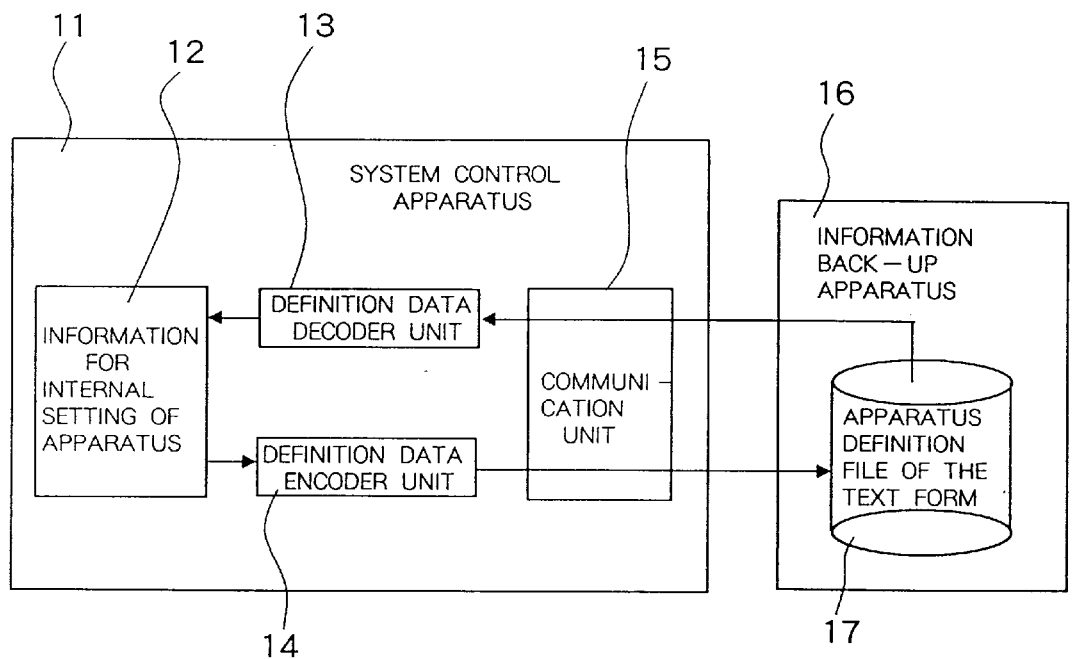
FIG. 2 is a block diagram of an information back-up system for information for setting a system control apparatus of the present invention.

An embodiment of the present invention is described in detail below with reference to the drawings. FIG. 2 is a block diagram of an information back-up system for information for setting a system control apparatus of the present invention. Referring to FIG. 2, reference numeral 11 denotes a system control apparatus, 12 information for internal setting of apparatus, 13 a definition data decoder unit, 14 a definition data encoder unit, 15 a communication unit, 16 an apparatus information back-up apparatus, and 17 an apparatus definition file of the text form.

In the embodiment of the present invention, the definition data decoder unit 13, the definition data encoder unit 14 and the communication unit 15 are disposed inside the system control apparatus 11 of a transmission apparatus of the embedded type, and the definition data decoder unit 13 and the definition data encoder unit 14 are connected to the apparatus definition file 17 of the text form of the apparatus information back-up apparatus 16 via the communication unit 15.

Next, operation of the embodiment of the present invention is described in detail with reference to FIG. 2. When up-loading the information for internal setting 12 into the apparatus information back-up apparatus 16, the apparatus information for internal setting 12 is converted into an apparatus definition file of the text form by the definition data encoder unit 14 and backed up in the apparatus definition file 17 of the text form of the apparatus information back-up apparatus 16. In this instance, in order to reduce the size of the apparatus definition file 17 of the text form, apparatus information set by default is not encoded into data of the text form.

On the contrary, when down-loading the information backed up in the apparatus definition file 17 of the text form of the apparatus information back-up apparatus 16 into the system control apparatus 11, the definition file to be transferred from the apparatus information back-up apparatus 16 to the system control apparatus 11 is converted into apparatus internal setting information by the definition data decoder unit 13 on the system control apparatus 11 side and the information is set to the information for internal setting of the apparatus 12.

It is otherwise possible to place another apparatus definition file 17 of the text form edited on a PC/WS (Programmable Controller/Work Station) in advance into the apparatus information back-up apparatus 16 and down-load the apparatus definition file into the system control apparatus 11.

Figure 3:
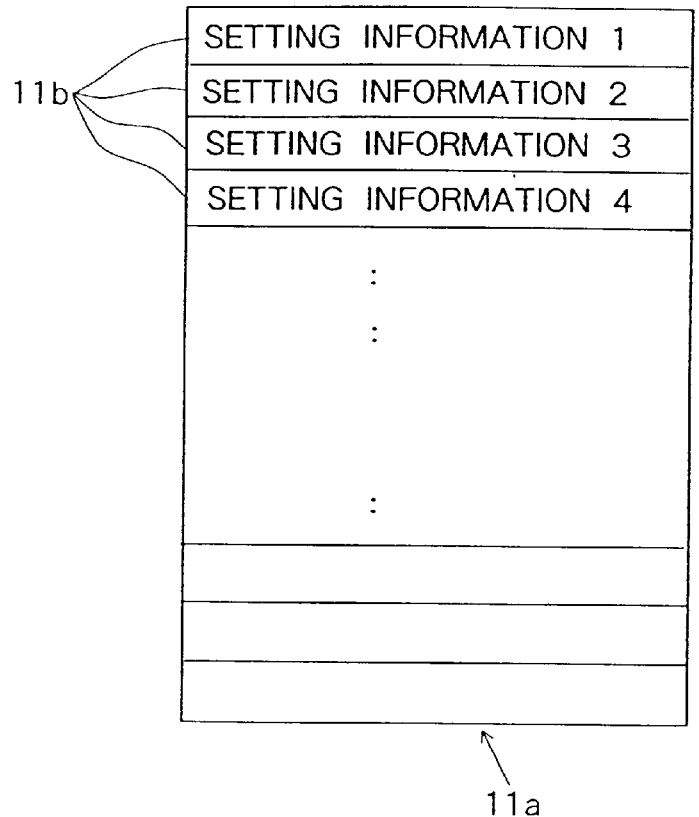
FIG. 3 is a diagrammatic view showing forms of information for internal setting of the system control apparatus.

FIG. 3 is a diagrammatic view showing a form of the system control apparatus internal setting information. Referring to FIG. 3, reference symbol 11a denotes a memory space, and 11b a memory address. The information for internal setting of the apparatus 12 is stored in the form depending on the memory space 11a of the system control apparatus 11.

Figure 4:
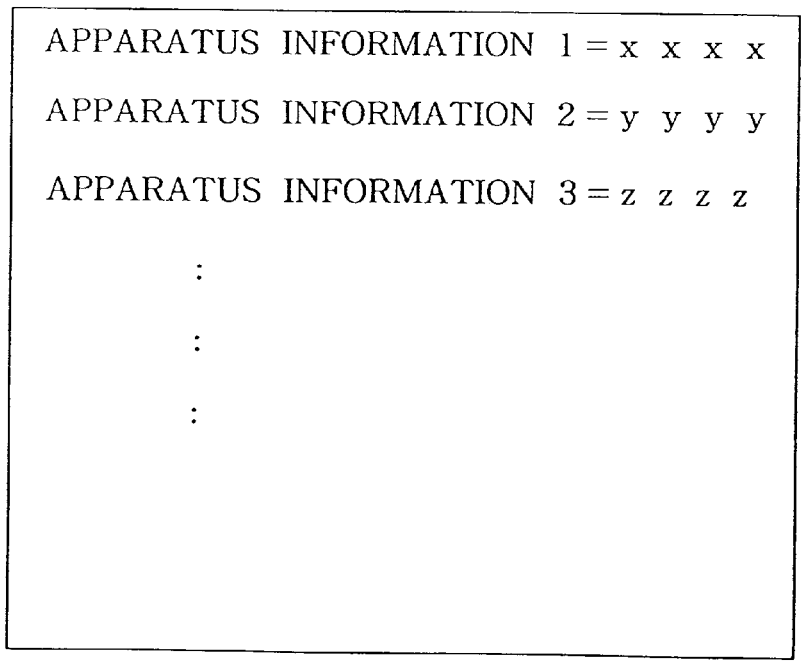
FIG. 4 is a diagrammatic view showing forms of an apparatus definition file of the text type.

FIG. 4 is a diagrammatic view showing a form of the apparatus definition file of the text form. The apparatus information is described in the text form in accordance with a defining function.

While the transmission apparatus of the embedded type is described in the present embodiment, the back-up method for firmware information of the present invention can be applied widely to ordinary system control apparatus.

The following effects are achieved by the back-up method for firmware information of the present invention.

1. Since the memory allocation of information for internal setting of the apparatus is determined by the definition data decoder unit each time the information is down-loaded, even if the information form of the apparatus internal setting information is changed or the memory allocation is changed by version up of the firmware, the back up apparatus definition file can still be used.

2. Since the back up apparatus definition file is in the text form, even if a function of the apparatus is added, it is only required to add a definition to the apparatus definition file.

3. Since the back up apparatus definition file is in the text form, it can be utilized also by another similar apparatus by editing the back up apparatus definition file.

4. Since the back up apparatus definition file is in the text form, the apparatus definition file of the text form can be edited using various text processing tools (editor, awk, perl and so forth) on a PC/WS, and setting of the apparatus can be performed off-line in advance.

5. Since apparatus default values are not encoded into the apparatus definition file, the size of the apparatus definition file of the back up text form can be minimized.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A back-up method for backing up firmware information for internal setting of a system control apparatus using an external back-up apparatus, comprising the steps of:

converting a form of the firmware information for internal setting into an apparatus definition file of the text form, up-loading the apparatus definition file of the text form into said external back-up apparatus, whereafter, in accordance with a request, converting the apparatus definition file of the text form of said external back-up apparatus into the form of the firmware information for internal setting, and down-loading said form of the firmware information for internal setting into said system control apparatus for internal setting of said system control apparatus.

2. A back-up method for firmware information as set forth in claim 1, wherein, when a function is added to the firmware of said system control apparatus, the same function is added to the apparatus definition file of said external back-up apparatus.

3. A back-up method for firmware information as set forth in claim 1, wherein setting of the firmware internal information of said system control apparatus is effected by down-loading of the apparatus definition file of the text form of said back-up apparatus edited using a text processing tool.

4. A back-up method for firmware information as set forth in claim 1, wherein setting of the firmware internal information of said system control apparatus is effected by down-loading of an apparatus definition file of the text form up-loaded in the text form from any other system control apparatus into said back-up apparatus and edited using a text processing tool.

5. A back-up method for firmware information as set forth in claim 1, wherein an internal apparatus default value of the firmware of said system control apparatus is not encoded into the apparatus definition file.

6. A back-up method for firmware information as set forth in claim 1, wherein said system control apparatus is a system control apparatus for transfer control.

* * * * *